US007991955B2

(12) United States Patent
Bienek et al.

(10) Patent No.: US 7,991,955 B2
(45) Date of Patent: Aug. 2, 2011

(54) METHOD AND APPARATUS TO ACHIEVE MORE LEVEL THERMAL GRADIENT

(75) Inventors: Michael D. Bienek, Austin, TX (US);
Victor F. Andrade, Austin, TX (US);
Randal L. Posey, Austin, TX (US);
Michael C. Braganza, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 299 days.

(21) Appl. No.: 11/610,379

(22) Filed: Dec. 13, 2006

(65) Prior Publication Data

US 2008/0147976 A1    Jun. 19, 2008

(51) Int. Cl.
*G06F 12/00* (2006.01)
(52) U.S. Cl. ................ 711/118; 365/201; 714/718
(58) Field of Classification Search .................. 711/118; 365/201; 714/718
See application file for complete search history.

(56) References Cited

U.S. PATENT DOCUMENTS

| | | | | | |
|---|---|---|---|---|---|
| 5,732,209 | A | * | 3/1998 | Vigil et al. ...................... | 714/30 |
| 5,764,079 | A | * | 6/1998 | Patel et al. ...................... | 326/40 |
| 5,848,018 | A | * | 12/1998 | McClure ........................ | 365/201 |
| 6,112,322 | A | * | 8/2000 | McGibney et al. ............ | 714/721 |
| 6,408,361 | B1 | * | 6/2002 | Petersen et al. ................ | 711/129 |
| 2002/0112126 | A1 | * | 8/2002 | Hayakawa et al. ............ | 711/128 |
| 2004/0059875 | A1 | * | 3/2004 | Garg et al. ..................... | 711/141 |
| 2005/0240844 | A1 | * | 10/2005 | Pullen et al. ................... | 714/724 |
| 2006/0049843 | A1 | * | 3/2006 | Jenkins et al. ................. | 324/765 |
| 2006/0143409 | A1 | * | 6/2006 | Merrell et al. ................. | 711/146 |

\* cited by examiner

*Primary Examiner* — Hashem Farrokh
(74) *Attorney, Agent, or Firm* — Zagorin O'Brien Graham LLP

(57) ABSTRACT

Achieving better uniformity of temperature on an integrated circuit while performing burn-in can result in reduced burn-in time and more uniform acceleration. One way to achieve better temperature uniformity is to control dynamic power in the core and cache by operating at different frequencies and increasing switching activity in the cache(s) during burn-in by changing operation of the cache so that during burn-in a plurality of memory locations in the cache(s) are accessed simultaneously, thereby increasing activity in the cache to achieve higher power utilization in the cache during burn-in.

9 Claims, 3 Drawing Sheets

METHOD AND APPARATUS TO ACHIEVE MORE LEVEL THERMAL GRADIENT

BACKGROUND

1. Field of the Invention

This invention relates to manufacturing of integrated circuits and more particularly to burn-in.

2. Description of the Related Art

For semiconductor devices, it often takes time for a failure to manifest itself. That is, although the semiconductor device may initially pass all tests, after a short time in the field the device fails. That is commonly referred to as infant mortality. In order to detect such latent defects, the manufacturing process typically employs an approach called burn-in to detect these latent failures. During burn-in the device is operated at elevated temperatures and/or voltages. By operating the device at an elevated temperature and/or voltage, the failure mechanism is accelerated and therefore occurs earlier in time. Tests performed after burn-in can determine whether latent defects uncovered during burn-in are present in the device. Burn-in time is typically measured in hours and is a function of temperature and/or voltage.

The temperature set point during burn-in testing is important because anything below the normal operating temperature specification, e.g., 95° C., does not achieve any acceleration. At a temperature of, e.g., 120° C., one may obtain the desired acceleration factor. At some higher temperature (dependent on package substrate and die size) the C4 bumps on the die start to crack from stress caused by thermal coefficients of expansion (TCE) mismatches in silicon and the package, as well as potentially shortening the overall life of the product. At even higher temperature damage to the device itself can occur. Thus, the window of desired and useful temperatures is relatively small.

Today's semiconductor devices, such as high power microprocessors, have a relatively new problem: a thermal gradient that prevents testing all areas of the die at the required temperature. This gradient occurs because the power can be concentrated in a smaller area and changes more abruptly. That is, the surface of the die is not at a uniform temperature. Therefore, the manufacturing process makes trade-offs between taking longer to burn-in the die or exceeding desired temperature limits.

Note that temperature gradients increase by roughly 50% each time the die is shrunk and the power level held constant. Thus, as semiconductor devices shrink from 130 nm to 90 nm, and then to 65 nm, and 45 nm, the thermal gradient problem will continue to increase. Thus, the problem of thermal gradients is expected to continue to increase.

There are several options for addressing the natural thermal gradient of any high power semiconductor device. The first option is just to run the semiconductor device much longer than is financially or logistically possible. A second option is to ship semiconductor devices of reduced quality by not extending the burn-in times. Obviously, that approach is generally not acceptable. A third option would be to increase the temperature to accelerate the cooler areas, but that could raise the temperature in higher power density areas beyond the safe limits and possibly create new problems in the silicon. Thus, the existence of the thermal gradient can force a choice between a chosen temperature for burn that over-tests some areas of the die or under-tests other areas. Today, with 35° C. gradients and even higher gradients projected for smaller geometry devices, the ability to effectively accelerate failures for all areas of the die is in question.

Thus, it would be desirable to provide improved burn-in for semiconductor devices by addressing the thermal gradient issue.

SUMMARY

One aspect of this invention is directed to achieving better uniformity of temperature while performing burn-in on the semiconductor device. One way to achieve better temperature uniformity is to increase activity in the cache(s) during burn-in by changing operation of the cache so that during burn-in a plurality of memory locations in the cache(s) are accessed simultaneously thereby increasing activity in the cache to achieve higher power utilization in the cache during burn-in as compared to normal operation of the semiconductor device, when, e.g., used in normal operation in a system. In an embodiment, that is accomplished by activating a plurality of ways simultaneously to increase activity in the cache. Another embodiment provides for accessing multiple cache lines in parallel during burn-in testing to increase activity in the cache.

In an embodiment an integrated circuit includes at least one core region; at least one cache memory, and a control circuit to cause a plurality of memory locations of the cache memory to be accessed simultaneously in response to one or more control signals. In an embodiment the control circuit is operable to activate a plurality of ways simultaneously to increase activity in the cache memory during burn-in. In an embodiment the control circuit is operable to cause access to multiple cache lines in parallel during burn-in testing to increase activity in the cache memory. In an embodiment the frequencies of the core(s) and cache(s) are independently controlled.

BRIEF DESCRIPTION OF THE DRAWINGS

The present invention may be better understood, and its numerous objects, features, and advantages made apparent to those skilled in the art by referencing the accompanying drawings.

FIG. 2 illustrates an embodiment in which multiple word lines are accessed in parallel during burn-in to increase cache activity during burn-in.

FIG. 3 illustrates an exemplary logical block diagram of a 16-way set associative architecture cache adapted to have increased activity during burn-in.

FIG. 4 illustrates an exemplary logical block diagram of a cache tag structure that can be adapted to cause increased activity during burn-in.

DESCRIPTION OF THE PREFERRED EMBODIMENT(S)

Figure 1:
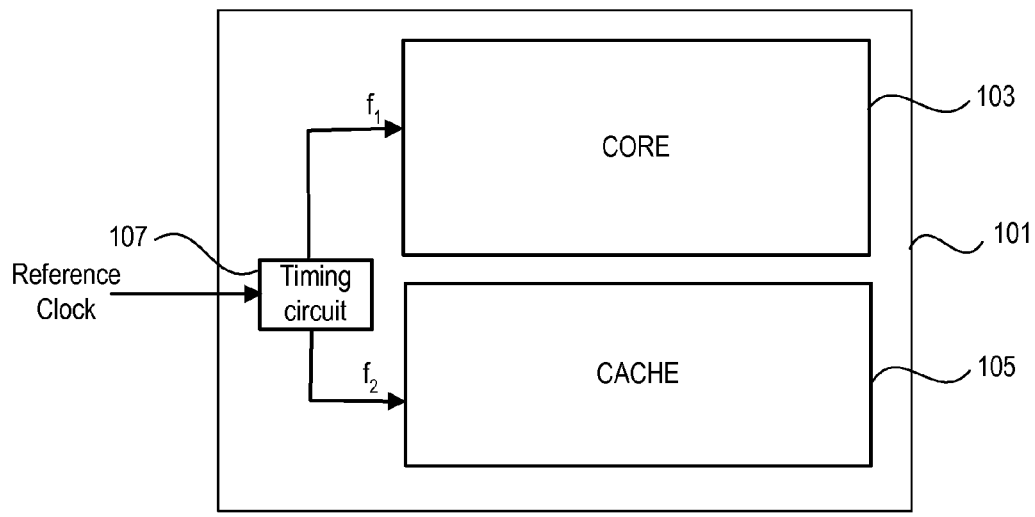
FIG. 1 illustrates a block diagram of a typical microprocessor.

Referring to FIG. 1, a typical microprocessor 101 is shown. As shown in FIG. 1, microprocessors are divided into two major areas: the core region 103 and the cache 105. The "core" includes the central processing unit and can have a high number of transistors switching at any one time. The "cache" contains memory elements and typically has a low percentage of transistors active. Further, the core typically requires faster transistors which draw more power even in a static mode. The cache can use transistors with a much lower leakage value. Hence, the core will typically consume more power per area (higher power density) than the cache during normal operation and during burn-in unless steps are taken to address the different power density differences in the core and cache during burn-in. The different power consumption in the core and cache areas of the processor exacerbates burn-in problems due to thermal gradients. Note that cache 105 may include multiple caches, e.g., L1, L2, and L3 caches.

One approach to dealing with the thermal gradient issues is to more effectively accelerate failures for all areas of the die to provide more uniform power density in a microprocessor being subjected to burn-in. One way more uniform density can be achieved is to increase power utilization in the cache to be closer to or approximately equal to the core power utilization. More uniform power density means that all areas of the die are closer to each other in temperature, which means that reduced burn-in durations can be realized while achieving the same level of acceleration. The result of increasing temperature in the cache during burn-in is to accelerate the infant mortality failures in the cache that ordinary burn-in approaches may not be able to accomplish. It has been estimated that potential savings in reduction of burn-in times and increased reliability can be in tens of millions of dollars in reduced capital and manufacturing expense. Note that actual burn-in times required for any particular product will always be a function of power, die size, types of defects, and activation energy of defects; so exact numbers for gains based on reduced thermal gradients will vary.

Another way to decrease the thermal gradient during burn-in is to operate the core(s) of the device at a lower frequency. That allows the static leakage current to become the dominant heating effect, which is theoretically more uniform than dynamic currents. That is mostly true for the core, but lower leakage devices are used in the memory caches. Therefore, cache has a lower base level of energy to create heat than the core and a thermal gradient will still form across the die. Thus, one way to help ensure more uniform power utilization in various areas of the microprocessor is to have the core region 103 operate at one frequency (f1), which is set low to minimize dynamic current, while the cache 105 operates at a maximum frequency (f2) to obtain maximum dynamic current. Note that separate timing circuits may be utilized for the different regions of the integrated circuit. One or more of the different frequencies may be supplied from timing circuits, e.g., timing circuit 107 or as independent clock signals supplied to the integrated circuit. Thus, further equalization of power density can result from independent control of the operating frequencies of the cache and core.

An embodiment may utilize logic built-in self-test, LBIST, to apply a pseudo-random set of vectors to the core area during burn-in. One embodiment achieves independent control of the core frequencies because the Logic Built-In Self Test (LBIST) engine used in the core has the ability to program a divider for its shift frequency and the boundary register clock that operate off of the JTAG test clock frequency. Assuming self test is active during burn-in, clocking the scan chains and the boundary registers during burn-in at a lower frequency helps reduce dynamic power utilized in the core. At the same time, the cache clock may be maintained at a higher frequency.

Another factor that causes a thermal gradient between the cache and the core is that the activity factor (number of transistors switching at any one time) is much, much lower in the cache than in the core area. Thus, in order to further increase power density in the cache, one or more embodiments of the invention create a higher activity factor in the cache during burn-in than during normal operation. Thus, in an embodiment shown in FIG. 2, power utilization of the cache is increased by modifying cache operation so that during burn-in multiple cache lines are accessed in parallel. Note that this approach, rather than controlling gradients within the core, addresses the major difference in power density between the core and the cache in normal operational states.

For example, during normal operation only one word line of the cache is accessed each clock cycle. According to the embodiment illustrated in FIG. 2, multiple word lines 205 are accessed in parallel during burn-in. Cache burn-in (CBI) word line enable logic 201 provides enables 203 for the various word lines 205. Word line enable logic 201 may be implemented as a shift register. The exact number of lines that are enabled may be controlled through JTAG registers. During the course of burn-in, the value in the shift register may be shifted to select different sets of word lines to be active. Multiplexers 207 select the CBI word line enables from the shift register 201 during burn-in when cache burn-in control line (CBI) 211 is active.

In addition to controlling how many word lines are active for any particular read or write access, the data lines may also be controlled so that the amount of transitions created through the columns is also controlled. Thus, a shift register 215 may also be loaded with data during burn-in from, e.g., a JTAG port. With the structure shown in FIG. 2, having shift registers that are enabled during burn-in, via multiplexers, it is possible to enable any number of rows in parallel and also to force any number of data transitions each cycle. Assume, for example, a pattern of "AAAA" (hexadecimal) is loaded in the enable register 201, which shifts each cycle. Then half of the rows would be enabled each cycle. If instead, the enable register is loaded with "1111" (hexadecimal), then one quarter of the rows are enabled each cycle. Similarly, if data register 215 shifts each cycle, the number of data bits that change each cycle can also be controlled. In that manner, additional portions of the cache can be exercised during burn-in leading to increased power consumption in the cache and more even power density overall in the microprocessor during burn-in. The flexibility to pick the number of cache lines accessed in parallel and/or the data patterns loaded into the cache allows the cache power density to be set to more closely match the core power density and thus reduce or level the thermal gradients. Flexibility to set the transition density (or activity factor) during burn-in allows more control over equalizing the thermal gradient.

Figure 2:
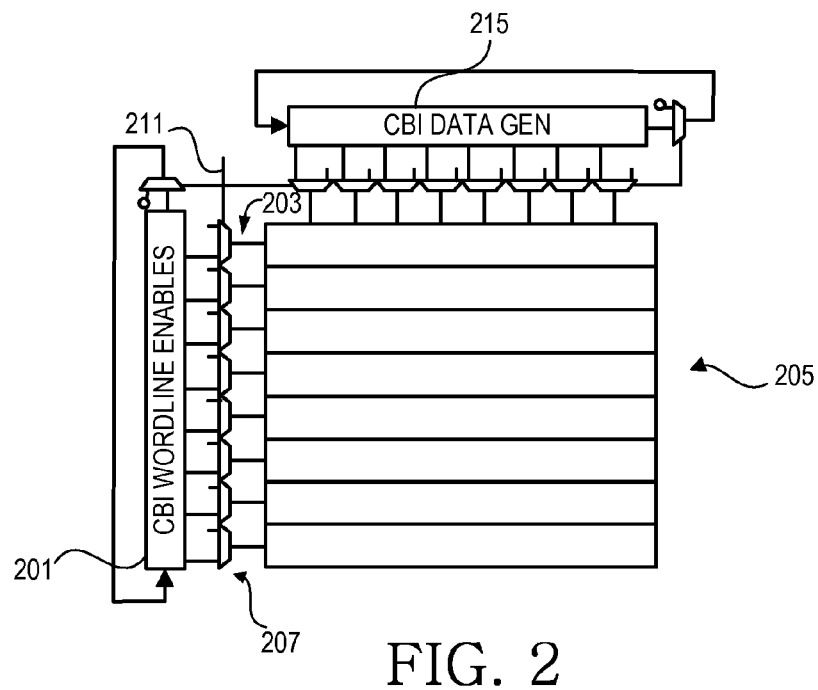
Figure 3:
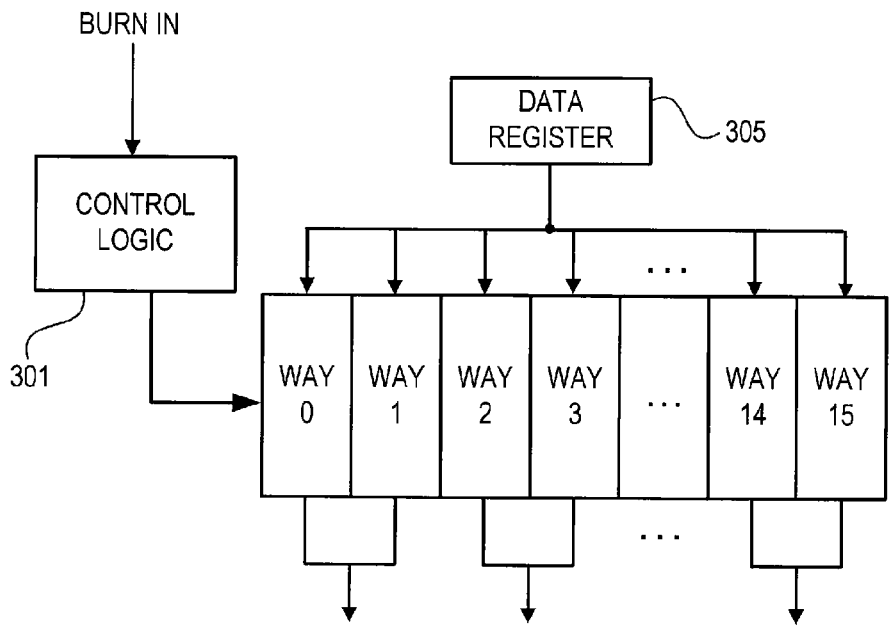

Another embodiment exploits the set associative architecture of caches in current microprocessors to increase activity in the cache during burn-in. FIG. 3 illustrates an exemplary logical block diagram of a 16-way set associative cache architecture. During burn-in the control logic 301 is configured, e.g., from JTAG, to enter a burn-in mode. In that mode multiple ways are enabled for each access. For example, in an embodiment, for each write and read access, all the odd or all the even ways are turned on by the control logic 301. The restriction to odd or even may be necessary to prevent collisions if the ways share I/O as shown in FIG. 3. In other embodiments, all the ways may be turned on, where collisions would not occur. Alternatively, similar to the structure shown in FIG. 2, the number of ways turned on can be made programmable by supplying, e.g., a register with enable bits for each way during burn-in. The particular ways can be changed by using a shift register for the enables and enabling shifting. In addition, data supplied to the cache may also be programmed for burn-in in an embodiment by using a register such as register 305 that may be programmed for burn-in. Other embodiments may not provide such a programmable register or allow the data to be supplied to the cache to be more random.

Figure 4:
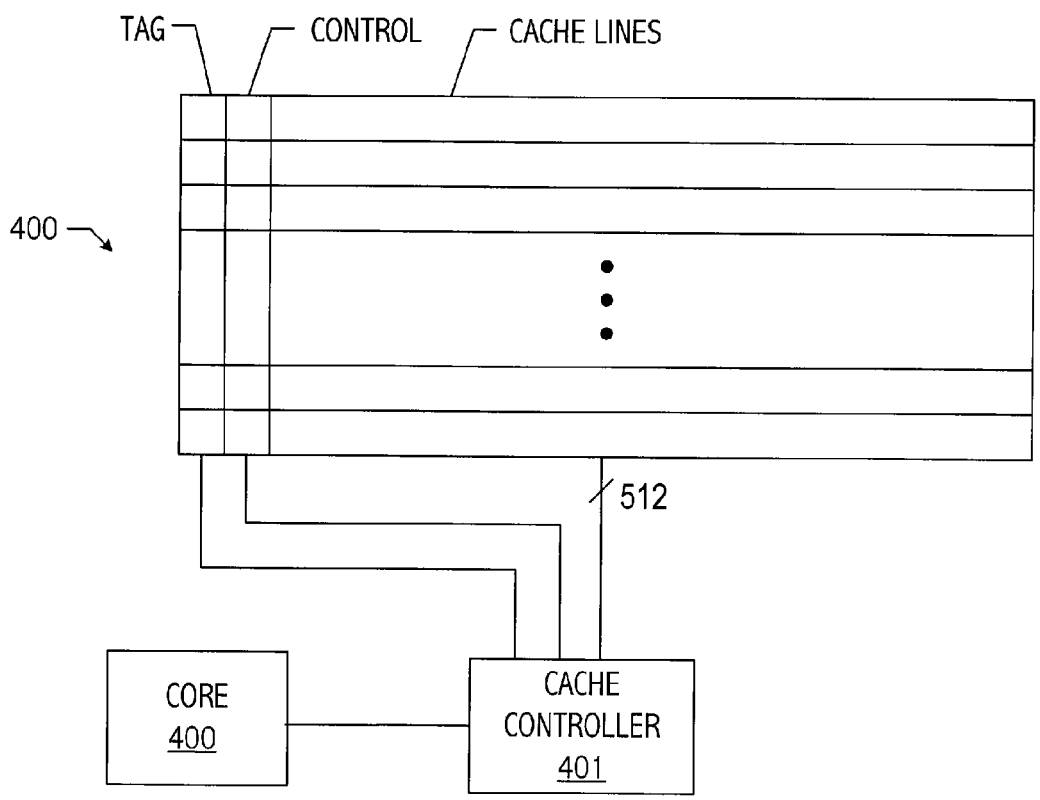

In still another embodiment, illustrated in FIG. 4 the TAGs to the cache are initialized such that up to 64 banks at a time are "hit". That is, each of the banks would believe they hold a valid page for the request and would all respond in parallel. Note that a bank is a physical implementation within the cache. One could architecturally design any number of ways per bank. Banks typically include copies of logic, tags and cache that can easily be replicated to achieve the desired cache size. A particular bank implementation may provide control points to enable parallelism for thermal gradient leveling. Cache lines remain intact within a bank. Typically, each bank has its own tag circuits. In one embodiment, there are 16 ways per bank.

This approach would enable an increase in dynamic power of (the number of banks×active ways per bank×normal dynamic power). Assume an embodiment with 64 banks, 5 W of static cache power and 10 mW of normal dynamic power. The 10 mW of normal dynamic power assumes that one way is active in the 64 banks normally. Although that may seem like a large multiplier, if the static power of the cache is 5 W and the dynamic power is 10 mW, then the new power level would be approximately 5.12 W of dynamic power (or an overall power of 10.12 W), which approaches core power (assuming an implementation described above in which 8 ways (either odd or even) can be activated at a time in a bank. The 5.12 W is based on 64 banks×8 active ways per bank× dynamic power of 10 mW per bank.

Note that active thermal solutions, where external cold is applied to the integrated circuit during burn-in, can actually cause a higher thermal gradient than passive/system solutions. That is because an active head forces cold uniformly across the die, so the edges which typically aren't generating any heat get additional cooling even though they do not need it. However, if the frequency is lowered to minimize core heating, the thermal solution may need to provide heat during burn-in, instead of removing heat. Note that heat flow into the device does not change the thermal gradient.

As described above, an embodiment may utilize logic built-in self-test, LBIST, to apply a pseudo-random set of vectors to the core area during burn-in. At the same time, since the caches are not required to run these vectors, a cache burn-in control logic (such as shown in FIG. 2 or 3) can be simultaneously enabled to control burn-in. Note that it may also be preferable to set the boundary registers into a toggle mode to generate energy near the edge of the die.

Figure 5:
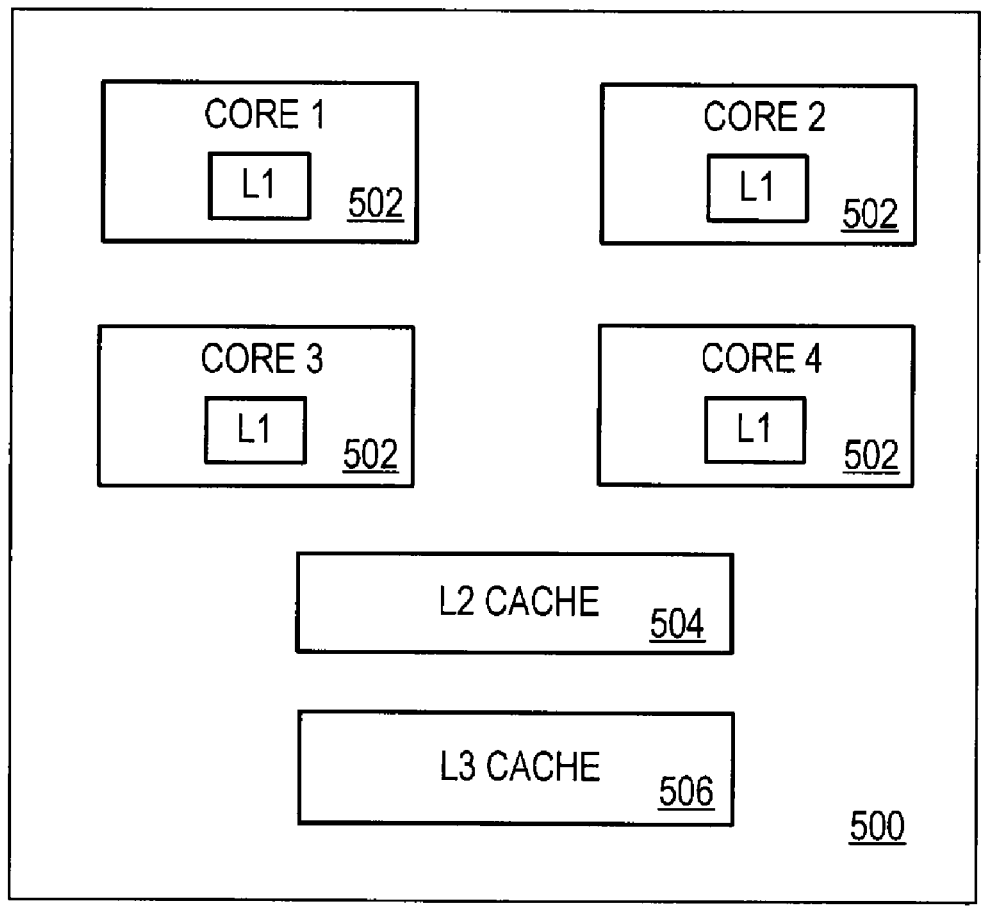
FIG. 5 illustrates an exemplary high level block diagram of a multi-core integrated circuit having multiple cache levels.

Referring to FIG. 5, in an exemplary embodiment, a multi-core configuration includes four processor cores 502, and each of the processor cores includes an L1 cache as illustrated. In addition, the integrated circuit 500 includes an L2 cache 504 and an L3 cache 506. The L1 cache may be sufficiently exercised during burn-in by LBIST or other test patterns so that no additional measures need be taken to increase L1 cache activity. For the L2 and L3 caches, the operation of the cache is modified at burn-in to increase cache activity by, e.g., accessing multiple ways during reads and writes. Note that in addition to accessing the data portion of the cache, the tag portion of the cache may also be written or read. Note that multiple portions of the caches may be accessed simultaneously. For example, the L1, L2, and L3 cache may all be accessed simultaneously during burn-in. Separate burn-in control logic may be provided for the various caches to achieve higher activity during burn-in or the caches may share some burn-in control logic.

The description of the invention set forth herein is illustrative, and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A method comprising:
    entering a burn-in mode for an integrated circuit having a cache memory with a set associative cache architecture, in which burn-in mode multiple ways are enabled to respond simultaneously to a read access;
    during the burn-in mode, reading from the multiple ways simultaneously in the cache memory of the integrated circuit in response to the read access to achieve higher power utilization in the cache during burn-in than during normal operation; and
    varying which of the ways are selected in response to the read access by shifting a shift register.

2. The method as recited in claim 1 wherein the multiple ways simultaneously accessed are one of even ways and odd ways.

3. The method as recited in claim 1 further comprising accessing multiple caches on the integrated circuit simultaneously during burn-in.

4. An integrated circuit made according to the method of claim 1.

5. The method as recited in claim 1 wherein how many ways are in the plurality of ways, is programmable.

6. An integrated circuit comprising:
    at least one core region;
    at least one cache memory; and
    a control circuit responsive to one or more control signals to enable a plurality of ways simultaneously to be one of read and written, respectively, in response to each respective read and write access, to increase activity in the cache memory during burn-in;
    output circuits shared by respective even and odd ways; and
    wherein the plurality of ways accessed in response to a read access at any one time are one of even ways and odd ways to avoid collisions on the output circuits.

7. The integrated circuit as recited in claim 6 further comprising multiple levels of cache memory including the at least one cache memory and operation of the one cache memory and at least another cache memory is modifiable to be accessed simultaneously to achieve a higher power density in the cache memories during burn-in testing than otherwise available.

8. The integrated circuit as recited in claim 6 further comprising multiple cores and multiple cache memories external to the cores, the multiple cache memories configured to be simultaneously accessed during burn-in.

9. A method comprising:
    entering a burn-in mode for an integrated circuit having a cache memory with a set associative cache architecture, in which burn-in mode multiple ways are enabled to respond simultaneously to a read access;
    during the burn-in mode, reading from the multiple ways simultaneously in the cache memory of the integrated circuit in response to the read access to achieve higher power utilization in the cache during burn-in than during normal operation;
    wherein the multiple ways simultaneously accessed are one of even ways and odd ways; and
    wherein respective output circuits are shared by an even way and an odd way and read access is enabled to one of even and odd ways at a time to avoid collisions on the respective output circuits.

* * * * *